Figure 3:
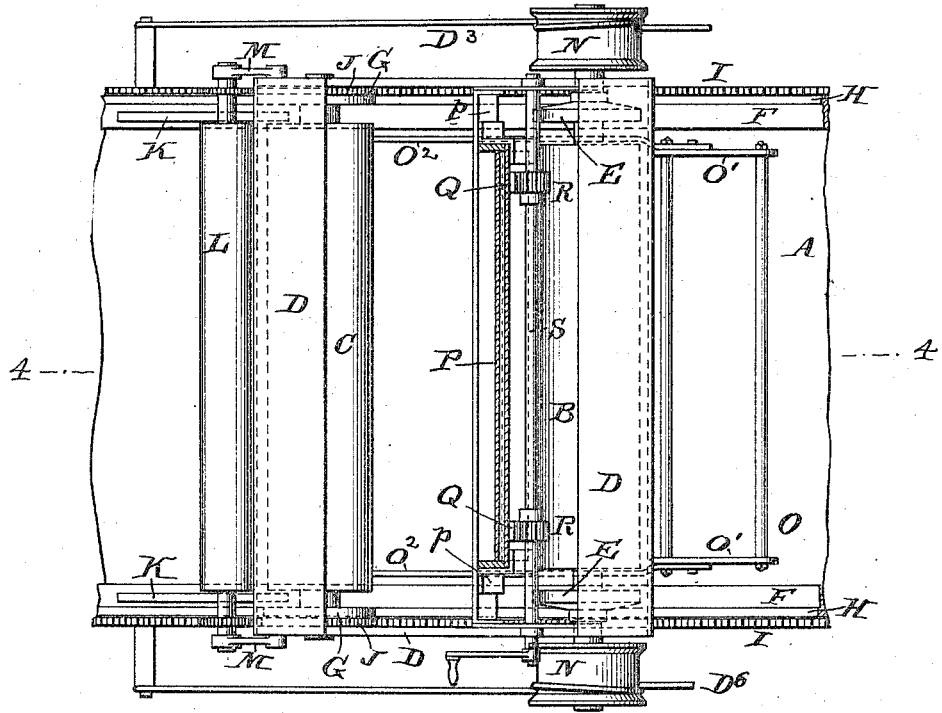

A. SHUMAN.
APPARATUS FOR MAKING WIRE GLASS.
APPLICATION FILED MAR. 27, 1906.
1,232,107.
Patented July 3, 1917.
3 SHEETS—SHEET 1.
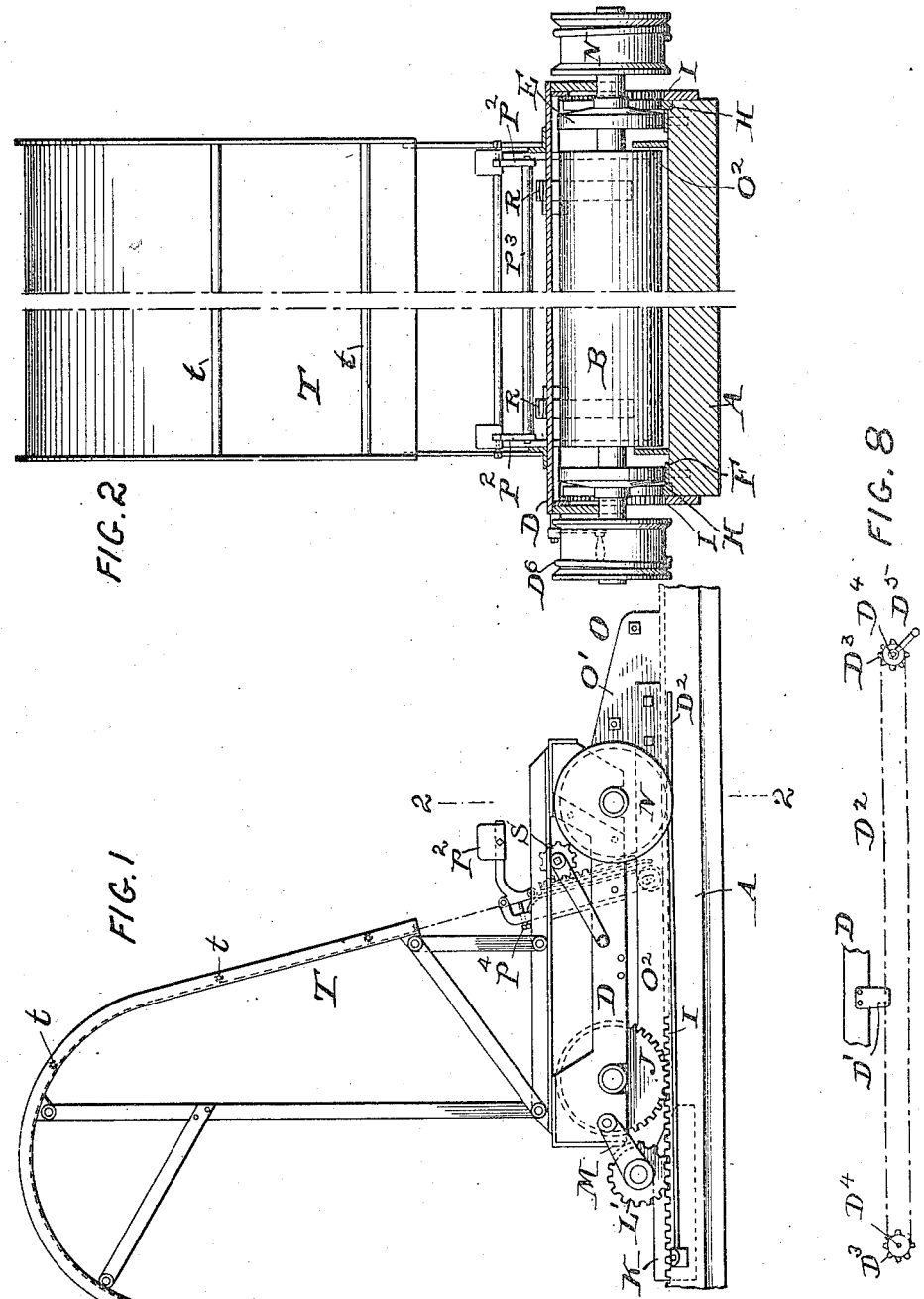
WITNESSES:
D. Webster, Jr.
R. M. Kelly.
INVENTOR
Arno Shuman
By 
Attorney

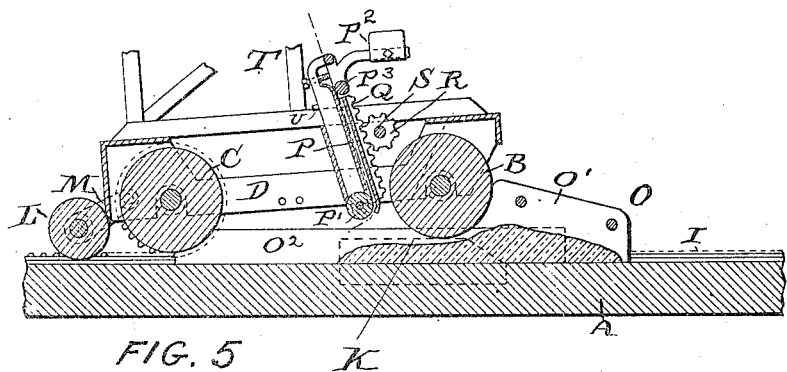

UNITED STATES PATENT OFFICE.

ARNO SHUMAN, OF CONNELLSVILLE, PENNSYLVANIA, ASSIGNOR TO THE CONTINUOUS GLASS PRESS COMPANY, A CORPORATION OF NEW JERSEY.

APPARATUS FOR MAKING WIRE-GLASS.

1,232,107.

Specification of Letters Patent.

Patented July 3, 1917.

Application filed March 27, 1906. Serial No. 308,328.

*To all whom it may concern:*

Be it known that I, ARNO SHUMAN, of Connellsville, county of Fayette, and State of Pennsylvania, have invented an Improvement in Apparatus for Making Wire-Glass, of which the following is a specification.

My invention relates to an apparatus for making wire glass and it consists in certain improvements which are set forth in the following specification and claims.

Among the various ways of making wire glass heretofore practised or attempted, it has been proposed to deposit a mass of molten glass upon the usual spreading table, to divide said mass into two parts, to roll down upon the table the forward portion of the mass of glass by means of a roller having a woven wire web trained down its front and descending side and back beneath it (and thus to form a lower sheet of glass having the wire impressed into but exposed at the upper surface thereof) and, finally, to roll out upon this sheet of glass and wire so formed and embedded the second or rear portion of the molten mass of glass to cover the exposed wire by a second sheet—the two sheets of glass coalescing or welding together within the meshes of the wire and thus forming the proposed sheet or plate of wire glass.

In the attempted practice of the above proposed method two serious difficulties were encountered. First, it was found that the wire glass plate produced contained very many and conspicuous bubbles of air. This air was carried into the glass of the lower sheet formed by the front roller, principally by the twists of the meshed wire web, and the air so entrapped, after being confined in the glass, was there in the action of the roll upon the mass of glass in front of it, pushed with the glass away from the wire twists and into positions well within the wire meshes where it was conspicuously noticeable in the polished product.

Second, in the use of the above proposed method another and serious defect was found in the product resulting from the blackening of one surface of the meshed wire in consequence of the introduction of the wire into the glass in front of the front roll. That is to say, the glass in the lump or wave in front of the roll where the wire web was introduced into it is probably of a temperature of 2,000° F. and it retains a high temperature so long as it is in this position because of its bulk. After being reduced by the roll to a thin plate upon the table, the temperature is greatly reduced (say to 1,000° F.) but still it maintains a high heat in the wire because the latter is impressed into the glass by the action of the front roll. The high temperature given the wire so embedded in the front wave and lower sheet of glass and the exposure to the air of the upper surface of the wire when so heated was found to result in the oxidization or blackening of its upper or exposed surface. This, of course, made the wire more conspicuously visible in the product, when viewed from the blackened side, and particularly noticeable and commercially objectionable in polished plates, for which the invention was, like the present invention, more especially designed. This defect in the product, united with that growing out of the presence and disposition of the air bubbles, rendered the product unsalable and commercially worthless.

The object of this invention is to obviate these difficulties and defects and to produce wire glass plate capable of being polished without developing objectionably visible air bubbles and with the wire therein uniformly bright on both sides.

To this end, the invention consists in apparatus for rolling two sheets of glass, preferably simultaneously, one upon the other, performing the rolling of the uppermost sheet at a little distance back of the rolling of the lowermost sheet, and progressively applying the meshed wire web upon the upper flat surface of the lowermost sheet after the latter has been rolled and in front of the wave or advancing mass of glass being rolled to form the second or superposed sheet, the meshed wire web being embedded into the surface of the lower sheet of glass before being covered by the second sheet.

This method may be practised by the use of any suitable means for progressively feeding a wire web upon and embedding it into the lower one of two sheets of glass which are preferably being simultaneously rolled upon a table, one upon the other and at points suitably separated to permit the wire web to be applied to the lower sheet wholly in advance of the following wave of glass being rolled to form the upper sheet, but I prefer to use the machine shown in the accompanying drawings, which has been found successful in practice.

Figure 10:
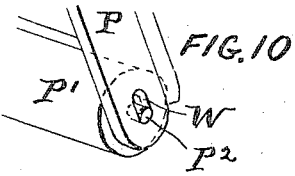
Figure 7:
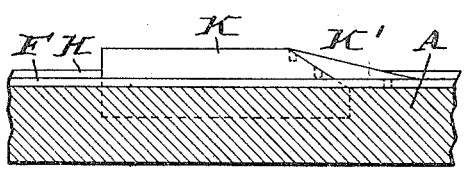
Figure 9:
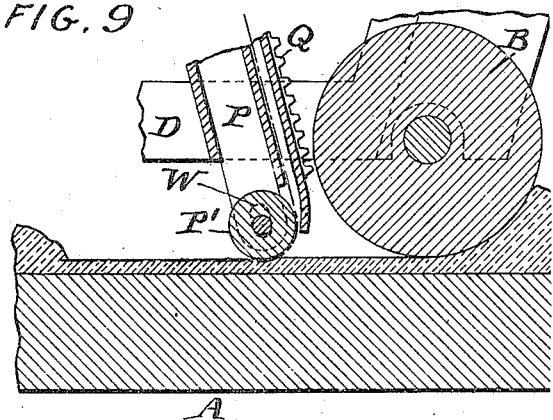

In the drawings:—Figure 1 is a side elevation of a machine for rolling glass and embodying my invention; Fig. 2 is a sectional front elevation of same on line 2—2; Fig. 3 is a plan view of same partly in section and with the upper part of the wire netting guide removed; Fig. 4 is a longitudinal sectional side elevation of the machine on line 4—4 Fig. 3; Fig. 5 is a view similar to Fig. 4, but indicating the action of the apparatus in the act of dividing the glass; Fig. 6 is a similar view to Fig. 4, but with the rolling operation in a more primary stage; Fig. 7 is a sectional elevation showing one of the cams; Fig. 8 is a view showing the means of propelling the flattening rolls and carriage; Fig. 9 is an enlarged view of a portion of Fig. 4; and Fig. 10 is a perspective view of a portion of the hopper and roll for feeding the meshed wire web to the glass sheet.

In said drawings, A is the table upon which the glass is rolled, said table having the usual side racks I I. Inside these racks the table is provided with two pairs of guide strips or "strangs" F and H, of which the outer strangs H are of greater thickness than the inner ones F. B and C are two rolls journaled a suitable distance apart in the carriage frame D. The forward roll B spreads the lowermost layer of glass directly upon the table and the rear roll C similarly spreads the upper layer or sheet of glass upon the lower one. The front roll B is shorter than the distance between the inner or proximate edges of the strangs F and upon its axial shaft, at a distance from the ends of the roll, are wheels or disks which run upon said strangs F to support the roll B at the proper distance above the surface of the table to give the lower sheet of glass the required thickness. The rear roll C has its main body preferably longer than the main body of the roll B, and may allowably extend some distance over the inner strangs F, as shown in Fig. 3, and on the axial shaft roll C are wheels or disks which run upon the outer and higher strangs H, said strangs H being of such greater thickness than the strangs F as to give the rear roller C an elevation above the sheet of glass of the front roll B, suitable to give the desired thickness to the second or superposed sheet formed by said second roll upon the lower sheet. The rear roll C is also provided upon its opposite ends with spur gears J J which engage with the stationary racks I I of the table and which thereby insure the proper rotary travel of the roll C, in the usual manner. Such spur gears, by their engagement with the racks, also propel the front roll B, through the medium of the frame D, and the proper rotary speed of the front roll B is effected by means of drums N N on the outer extremities of its shaft, around which drums are trained the cables $D^6$ $D^6$ having their ends secured to arms projecting from the front and rear ends of the table. As a suitable means for drawing the carriage along the track, a chain and sprocket wheel mechanism such as shown in Fig. 8 may be employed. In this case, an endless sprocket chain $D^2$ is guided about sprocket wheels $D^3$ pivoted at $D^4$ on fixed centers which may be attached to the tables in any suitable way, and one of these sprocket wheels may be rotated by a crank handle $D^5$. The chain $D^2$ is connected to a bracket D' bolted to the carriage frame D. By rotating the crank $D^5$, the carriage may be pulled forward or backward.

The small roll L is simply a trailer, geared with the racks and resting by its weight upon the double sheet for the purpose of smoothing its surface, or it may be used to give the sheet any desired surface configuration provided on said roll. Said roll L is shown of the same length as the body of the roll C and it is journaled in arms or links M, the forward ends of which are pivotally connected with the carriage frame, as indicated in the drawings.

O is a double "plow" or "gun." That is to say, in addition to the two side plates O', forming the usual plow for a front roll B, said side plates are provided with external rearwardly directed extensions $O^2$ which reach past and close to the ends of the roll B, and at their rear ends have the usual plow contact with the rear roll C. The plow for the rear roll is therefore wider than that for the front roll by at least the thickness of the plates O'.

K K are two opposite elevated longitudinal cams situated upon or in line with the strangs F which support the front roll B and, consequently, in the path of the end wheels E of said roll. These cams are to lift and sustain the roll B when the carriage is run back to its starting position over the table preparatory to the rolling operation. The rear rolls C and L are not elevated by the cams K in the movements of the carriage, said rear rolls being of such length as to pass between the opposite cams K, the prolonged shafts of said rear rolls passing above said cams.

Said cams K have their front ends rather abruptly inclined, as indicated in the drawings, to give a correspondingly rapid descent of the front roll B when the carriage is advanced; but, to facilitate the ascent of the rolls B when the carriage is being retracted to its starting position, removable supplemental inclines K' K' are temporarily placed upon the permanently inclined ends of the cams, where they are removably held in place by dowel pins, as shown.

T is a guide or chute for the woven wire web or sheet which is to be inserted between the upper and lower rolled sheets of glass. Said guide T, mounted above and upon the carriage D, consists, as here shown, of a wide metal plate curved rearwardly at its upper end and stiffened by angle-irons at its edges. These angle-irons project forwardly from the plate and have notches cut therein to receive the cross-rollers or rods $t$ placed at suitable intervals along the guide and over the wire web resting on said guide. The lower end of the guide or chute T is arranged back of the front roll B a short distance, and a few inches beneath said lower end of the guide T, and consequently between the rolls B and C and within the carriage D, is arranged a second guide or "hopper" P. This hopper comprises two plates with a space between them in alinement with the wire on the guide T, so that said wire web passes down between the plates of the hopper behind the front flattening roll B. Said hopper also includes a transverse roller P' arranged beneath the rear plate of the hopper, under which roller the wire web passes rearwardly and by which it is downwardly passed upon the glass sheet rolled by the front roll B so as to be embedded in the upper surface of said glass sheet. The roller P' has its shaft or journals P² supported in slotted parts W in the ends of the hopper P as shown more fully in Figs. 9 and 10. The hopper P is lowered until the stop V limits its downward movement and then the weight of the roller P' acts freely upon the meshed wire web to embed or roll it into the upper surface of the wire glass sheet as shown in Fig. 9. The hopper may further contain a transverse pressure roller P³, arranged over the upper edge of the front plate of the hopper and adapted to be moved rearwardly so as to press the wire web against the rear plate and thereby apply tension. This tension roller P³ is revolubly supported in the weighted arms P² which are pivoted to the hopper and by which the roller is adapted to be pressed against the wire web or retracted out of the path of the latter. Screws P⁴ serving as adjustable stops for the weighted arms P², may be employed to prevent too great pressure of the roller P³ against the web.

The hopper P is made vertically adjustable in guides $p$ on the carriage, and vertical movement is given to the hopper by means of a transverse crank-shaft S provided with pinions R which engage with racks Q fixed on the front plate of the hopper.

In operating the machine above described, in the practice of my invention, the roll carriage is brought into position at the head of the table A the front roll B resting on the cams K K a few inches back of their front inclined ends and with the hopper P elevated and the wire web adjusted to project slightly below the roller P' of said hopper, said wire web being movably held by the presser roller P³. The molten glass is then dumped upon the table in front of the roll B and within the front plow at a point about in line with the inclined ends of the cams, the glass being distributed as evenly as possible across the table by manipulation of the ladle. The carriage is then moved forward and the front roll B descends from the cams into the middle of the mass of molten glass, which, of course, has spread somewhat, both forwardly and backwardly (Fig. 5.) As the carriage continues its forward motion, and after the front roll B has flattened a few inches of the lower sheet of glass from the front portion thereof and in advance of the second portion (Fig. 6) and when the hopper has advanced over said flattened portion of the lower sheet, the hopper is lowered by the crack-shaft so as to embed the lower edge of the wire web in the upper surface of the flattened glass surface through the action of the roller P' (Fig. 4). Such engagement of the end of the wire sheet with the glass causes the wire sheet to be drawn downward and rearward as the carriage continues to advance. The wire is thenceforward laid upon and embedded into the upper surface of the lower glass sheet being formed by the roll B, and, meantime, said wire is being promptly covered by the advancing wave of glass in front of the rear roll C without other pressure than that of the advancing glass, and, therefore, under conditions favorable to the expulsion of air from about the wire as the glass embraces it. By reason of the relation of the wire web to the lower sheet of glass prior to its being covered by the rear wave of glass, and by reason of the brief exposure of the wire before being fully embraced by the glass on both its upper and lower surfaces, the wire is not highly heated before such complete embracement thereof and it is accordingly not discolored or oxidized. Moreover, there is no movement of the lower sheet of glass relative to the web when or after said wire is delivered upon and embedded in the surface of the glass, and there are consequently no bodies of air which may be entrapped with the wire and, accordingly, the finished sheet is practically devoid of all air bubbles.

The roller P' may be supported in any other suitable manner so long as it acts upon the wire web to embed it into the upper surface of the lower layer or sheet of glass, but I have preferred to support it in the lower part of the hopper or guiding device for the web, so that it may be raised in the preliminary operation of subdividing the glass as shown, for example, in Fig. 5.

I use the word "hopper" to designate any form of wire controlling device that may be employed for the purposes of the hopper shown, and, generally, do not wish to be restricted to the particular forms of any of the parts entering into the apparatus herein illustrated and described.

In the apparatus here shown, the rolls B and C are so close together that the two sheets or layers of glass are in part simultaneously rolled, but I do not wish to restrict myself to such simultaneous rolling because it is evident that if the said rollers B and C are sufficiently separated the forward roller B may complete the rolling of the lower sheet of glass before the rear roll C reaches the mass of glass from which the upper layer or sheet of glass is to be rolled.

Matter shown in this application and not claimed herein forms subject matter of my application Ser. No. 282,546, filed October 13, 1905.

Having now described my invention, what I claim as new and desire to secure by Letters Patent, is:—

1. In a machine for rolling wire glass, the combination of a table upon which the glass is rolled, a carriage having forward and rear rolls for rolling one layer of glass upon the other the rolling surfaces of the forward roll being separated from the table surface a distance equal to approximately one-half the thickness of the glass sheet in completed form, and the rear roll having its rolling surface separated from the table surface a distance approximately double that of the forward roll, a guide on the carriage intermediate of the two rolls for guiding the web down upon the glass after it is rolled by the forward roller, a roller below the guide for pressing the wire web down upon the upper surface of the lower layer of glass and in position to be covered by the fresh glass pushed forward by the rear roll in the formation of the upper layer, and means to adjust the web guiding roller to or from the table.

2. In a machine for rolling wire glass, the combination of a table upon which the glass is rolled, a carriage having forward and rear rolls for rolling one layer of glass upon another, the rolling surface of the forward roll being separated from the table surface a distance equal to approximately one-half the thickness of the glass sheet in completed form, and the rear roll having its rolling surface separated from the table surface a distance approximately double that of the forward roll, a guide carried by the carriage intermediate of the two rolls for guiding the wire webbing upon the glass rolled by the forward roll, an adjustable pressure roll below the hopper guide to press the wire web upon the upper surface of the lower layer of glass whereby it is in position to be covered by the fresh glass pushed forward by the rear roll in the formation of the upper layer, means to control the freedom of passage of the wire webbing through the hopper, and means to adjust the web pressure roll to or from the table.

3. In a wire glass rolling machine, the combination of a table, a carriage having forward and rear rolls, means for supporting these rolls so as to cause the forward roll to travel at a less elevation from the table than the rear roll, means arranged between the rolls for feeding the wire webbing to the glass after it is rolled by the forward roll in advance of the rear roll, a vertically adjustable frame adjustably supported by the carriage, and a pressure roll journaled in the adjustable frame with provision for vertical adjustment therein whereby it shall by its weight press the wire web into the extreme upper surface only of the lower layer of glass in advance of the formation of the lower layer by the rear roll.

4. In a machine for rolling wire glass, the combination of a table upon which the glass is rolled, a carriage having a forward and a rear roll for rolling one layer of glass upon another, a hopper carried by the carriage intermediate of the two rolls for guiding the wire webbing upon the glass rolled by the forward roll and in position to be covered by the glass pushed forward by the rear roll, means for adjusting the hopper toward and from the table, and a stationary guide for the wire webbing arranged upon the carriage in position to deliver the wire to the hopper.

5. In a machine for rolling wire glass, the combination of the table, a carriage having forward and rear rolls, means for raising and sustaining the forward roll at the head of the table and for lowering it into the lump of glass to be rolled, and a hopper secured to the carriage at the rear of the forward roll for guiding the wire webbing to the glass between the rolls.

6. In combination with a glass spreading table and a pair of connected spreading rolls arranged one in advance of the other and at different elevations from the table, a double plow in which the plates forming the plow for the rear roll are connected with those forming the plow for the front roll and extend past the ends of the front roll.

In testimony of which invention, I hereunto set my hand.

ARNO SHUMAN.

Witnesses:
 ERWIN S. KERR,
 W. H. WILLIAMS.